United States Patent
Kasahara

(10) Patent No.: US 9,414,045 B2
(45) Date of Patent: Aug. 9, 2016

(54) STEREO CAMERA

(71) Applicant: Ryosuke Kasahara, Kanagawa (JP)

(72) Inventor: Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 211 days.

(21) Appl. No.: 14/190,517

(22) Filed: Feb. 26, 2014

(65) Prior Publication Data

US 2014/0267622 A1 Sep. 18, 2014

(30) Foreign Application Priority Data

Mar. 14, 2013 (JP) ................................. 2013-052093

(51) Int. Cl.
| | |
|---|---|
| *H04N 13/02* | (2006.01) |
| *G01B 11/02* | (2006.01) |
| *G06T 7/00* | (2006.01) |
| *G06T 5/00* | (2006.01) |
| *G01C 3/08* | (2006.01) |
| *H04N 13/00* | (2006.01) |
| *G03B 35/08* | (2006.01) |

(52) U.S. Cl.
CPC .......... *H04N 13/0203* (2013.01); *G01B 11/026* (2013.01); *G01C 3/085* (2013.01); *G06T 5/006* (2013.01); *G06T 7/0075* (2013.01); *H04N 13/0214* (2013.01); *G03B 35/08* (2013.01); *G06T 2207/10012* (2013.01); *G06T 2207/10024* (2013.01); *G06T 2207/30261* (2013.01); *H04N 2013/0081* (2013.01)

(58) Field of Classification Search
CPC ................................. G01C 11/02; G01C 11/06
See application file for complete search history.

(56) References Cited

U.S. PATENT DOCUMENTS

| | | | |
|---|---|---|---|
| 4,295,153 A | | 10/1981 | Gibson |
| 6,018,630 A | * | 1/2000 | Arai ....................... G03B 13/02 396/51 |
| 6,687,003 B1 | | 2/2004 | Sorensen et al. |
| 8,345,144 B1 | * | 1/2013 | Georgiev ............. H04N 5/2254 348/335 |
| 2003/0197931 A1 | * | 10/2003 | Yano ...................... G02B 23/00 359/431 |
| 2009/0153664 A1 | | 6/2009 | Higuchi et al. |
| 2010/0246892 A1 | * | 9/2010 | Hirasawa ............... G01C 3/085 382/106 |
| 2011/0254947 A1 | | 10/2011 | Kasahara |
| 2012/0140047 A1 | | 6/2012 | Yamashita |
| 2013/0038723 A1 | * | 2/2013 | Tsutsumi .................. G01S 5/16 348/139 |

FOREIGN PATENT DOCUMENTS

| | | |
|---|---|---|
| EP | 2 071 491 A1 | 6/2009 |
| EP | 2 464 128 A2 | 6/2012 |
| WO | WO 2010/073953 A1 | 7/2010 |

OTHER PUBLICATIONS

The Extended European Search Report issued Nov. 12, 2014, in Application No. / Patent No. 14156443.5-1905 / 2779654.

* cited by examiner

*Primary Examiner* — Huy T Nguyen

(74) *Attorney, Agent, or Firm* — Oblon, McClelland, Maier & Neustadt, L.L.P

(57) ABSTRACT

A stereo camera for measuring distance to an object using two images of the object having parallax includes an optical multiplexer to set a length of light path of each of the two images having different spectrum properties and parallax to the same length and to superimpose each of the light paths to one light path; an image capturing element to detect luminance of at least two images having different spectrum properties; an optical device to focus a superimposed image on the image capturing element; and a distance computing unit to compute distance to the object using parallax between the two images.

15 Claims, 16 Drawing Sheets

α = 52 DEGREES

α = 45 DEGREES

α = 52 DEGREES

FIG. 14
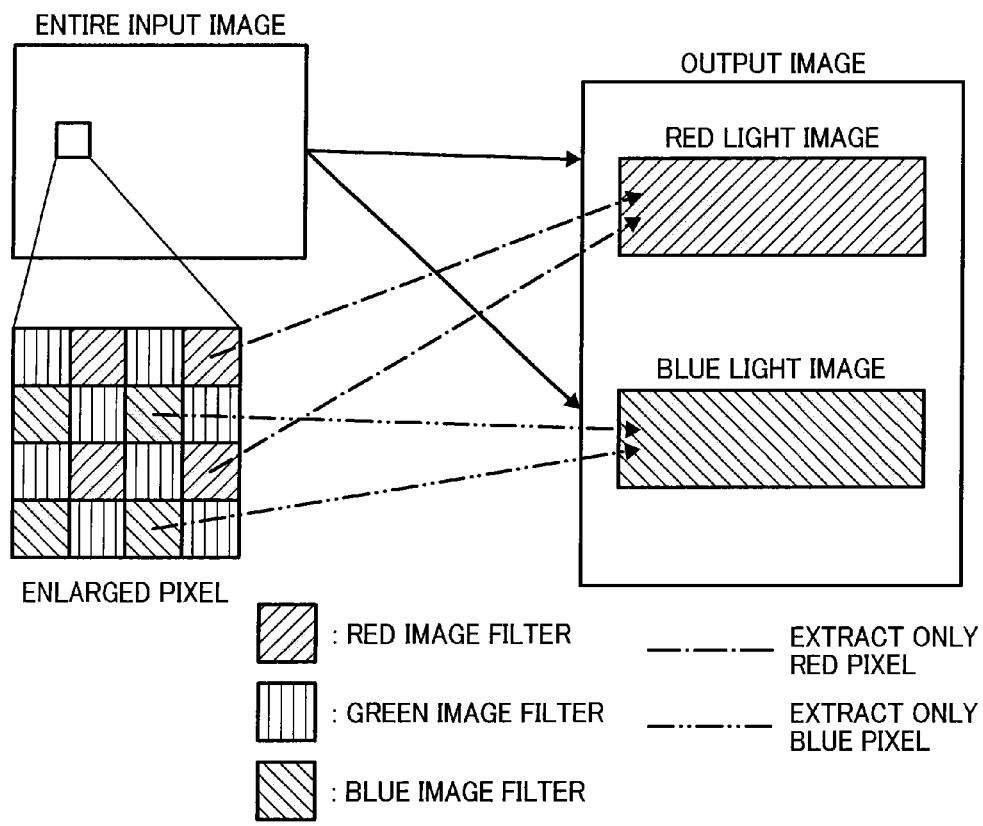
FIG. 15A    FIG. 15B    FIG. 15C
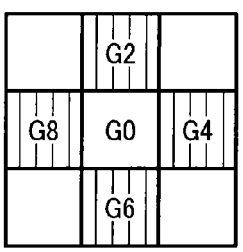    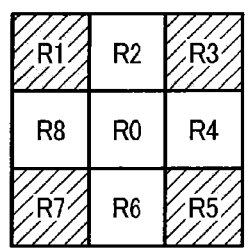    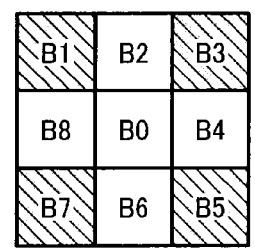

CHROMATIC-MAGNIFICATION ABERRATION CORRECTION

DISTORTION ABERRATION CORRECTION

EQUIANGULAR LINEAR FITTING

○ OPTIMAL POSITION PER PIXEL UNIT
● SUB-PIXEL ESTIMATION RESULT

PARABOLIC FITTING

○ OPTIMAL POSITION PER PIXEL UNIT
● SUB-PIXEL ESTIMATION RESULT

STEREO CAMERA

CROSS-REFERENCE TO RELATED APPLICATION

This application claims priority pursuant to 35 U.S.C. §119 to Japanese Patent Application No. 2013-052093, filed on Mar. 14, 2013 in the Japan Patent Office, the disclosure of which is incorporated by reference herein in its entirety.

BACKGROUND

1. Technical Field

The present invention relates to a stereo camera that measures distance to an object based on parallax of the object.

2. Background Art

Conventionally, a driver support system such as an adaptive cruise control (ACC) has been developed to measure a distance between a driver's vehicle and a vehicle ahead the driver's vehicle and to adjustment a speed the driver's vehicle and maintain the distance to other vehicle. As a technique for measuring a distance to a vehicle ahead of the driver's vehicle, a stereo camera can be used. The stereo camera computes position information of an object by analyzing images captured by two image capturing units and having parallax with respect to the object. For example, U.S. Pat. No. 6,687,003 discloses such a stereo camera. As to the stereo camera disclosed in U.S. Pat. No. 6,687,003, left and right images are converted into spectrum images having different spectrum properties such as blue light image and red light image. One of the converted light images is incident to a front face of a half-mirror and other light image is incident to a rear face of the half-mirror via a mirror. The light image incident to the front face passes through the half-mirror and the light image incident to the rear face of the half-mirror is reflected on the half-mirror so that the two light images are superimposed on the same light path. The superimposed light images enter an image capturing element via a lens, in which the superimposed light images are separated by a color filter disposed for the image capturing element into each light image and received by each light receiving element disposed for the image capturing element. Based on a parallax value of the two light images having different spectrum properties, distance to the object can be computed.

The above described stereo camera can be applied to a system to display three dimensional images to human eyes, and can be also applied to a system to measure distance requiring higher precision.

In the optical system of U.S. Pat. No. 6,687,003, one of left and right images is guided to a half mirror without intervening an optical device such as a mirror, and the other one of left and right images is guided to the half mirror via the mirror. Therefore, a difference occurs between the light path lengths of left and right images. Even if no difference occurs between the light path lengths of left and right images from the object, positional deviation occurs between the left and right images having the parallax.

As to the stereo camera of U.S. Pat. No. 6,687,003, compared to a case that no difference occurs between the light path lengths of left and right images from the object, when difference occurs between the light path lengths of left and right images from the object, positional deviation by parallax caused by reflection at an optical device such as a mirror disposed in the light path becomes great. When the distance measurement computing is conducted, the left and right images may need to be matched with 0.1 pixel precision. If the positional deviation caused by parallax becomes too great, the left and right images cannot be received by adjacent light receiving elements on an image capturing element, and positional error of several pixels occurs to the corresponding pixels. In this case, the left and right images cannot be matched in the pixel matching process conducted before the distance measurement computing. Therefore, computing error of the distance measurement becomes great, with which distance measurement computing cannot be conducted with high precision.

SUMMARY

In one aspect of the present invention, a stereo camera for measuring distance to an object using two images of the object having parallax is devised. The stereo camera includes an optical multiplexer to set a length of light path of each of the two images having different spectrum properties and parallax to the same length and to superimpose each of the light paths to one light path; an image capturing element to detect luminance of at least two images having different spectrum properties; an optical device to focus a superimposed image on the image capturing element; and a distance computing unit to compute distance to the object using parallax between the two images.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 14 is a diagram that explains light separation processing;

FIGS. 15A, 15B, and 15C are diagrams that explain Bayer interpolation and chromatic-magnification aberration correction;

Figure 1A:
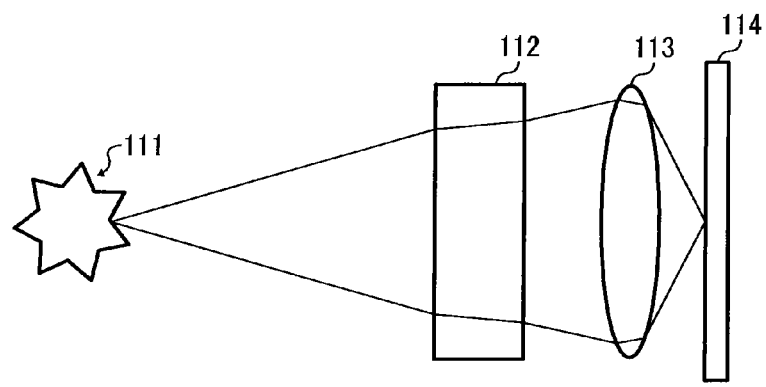
FIGS. 1A and 1B respectively illustrate an example of an light path of light that passes through an light path, in which light path thickness of a prism changes light path from a object to an image sensor.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have the same function, operate in a similar manner, and achieve a similar result.

Referring now to the drawings, a description is given of an apparatus or system for an image projection apparatus such as a projector according to an example embodiment.

A description is given of a light path to an object changeable by an light path thickness of a prism (superimposing module). Each of FIGS. 1A and 1B is an example in which an light path of light that passes through a light path thickness of a prism from a object 111, and is focused by a lens 113 to form an image on an image capturing element 114 such as an image sensor.

As illustrated in FIG. 1A, both of light coming from the left and right of the object 111 pass through the same prism 112. FIG. 1A illustrates a case that the light path thickness of the prism 112 for the light from the left and right have the same light path when passing through the lens 113, and therefore, it is possible to cancel an influence of external disturbance.

Figure 1B:
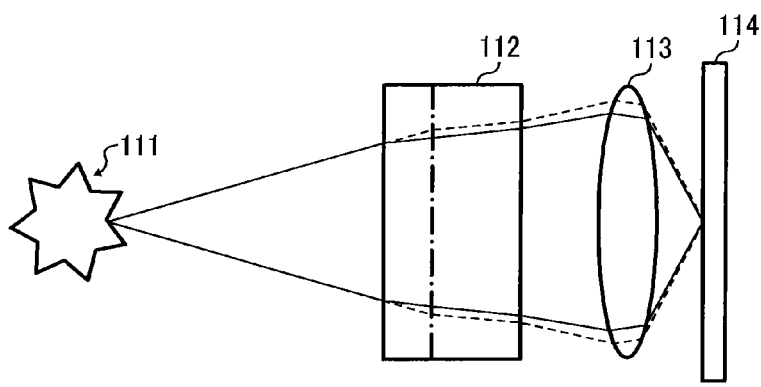

FIG. 1B illustrate a case that the light path thickness of the prism 112 is thicker than that of FIG. 1A, in which a light path of light that passes through the lens 113 shifts as illustrated in a dotted line in FIG. 1B. A solid line in FIG. 1B illustrates a light path of light illustrated in FIG. 1A. In a case where a distance of each of the light from the left and right from the object 111 is different, and light paths of the light from the left and right passing through the lens 113 at the same position do not correspond with each other, the light from the right is in a state illustrated in FIG. 1A, and the light from the left is in a state illustrated in FIG. 1B. Accordingly, it is not possible to cancel the influence of external disturbance such as temperature, or the like. In view of such issues, in an example embodiment of the present invention, by using difference of spectrum properties, light paths of two images having parallax are superimposed and then focused on an image capturing element via an optical member.

Figure 2:
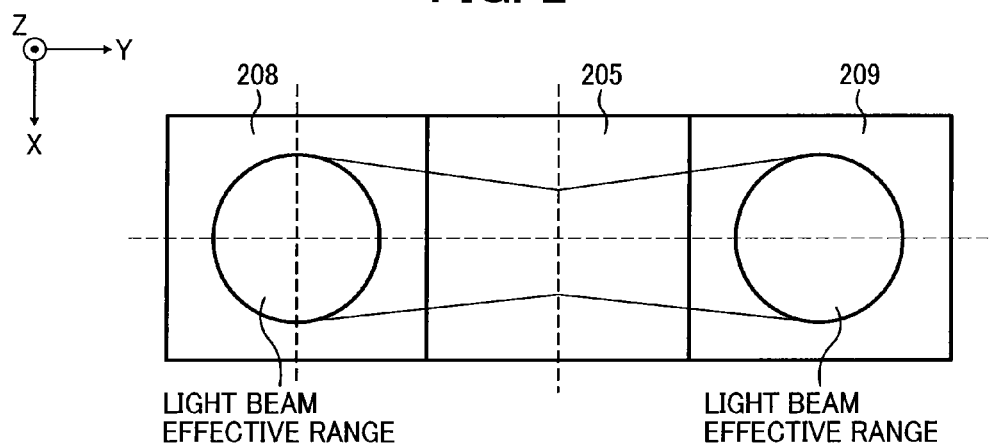
FIG. 2 schematically illustrates a structure of a stereo camera of Example 1.
Figure 3:
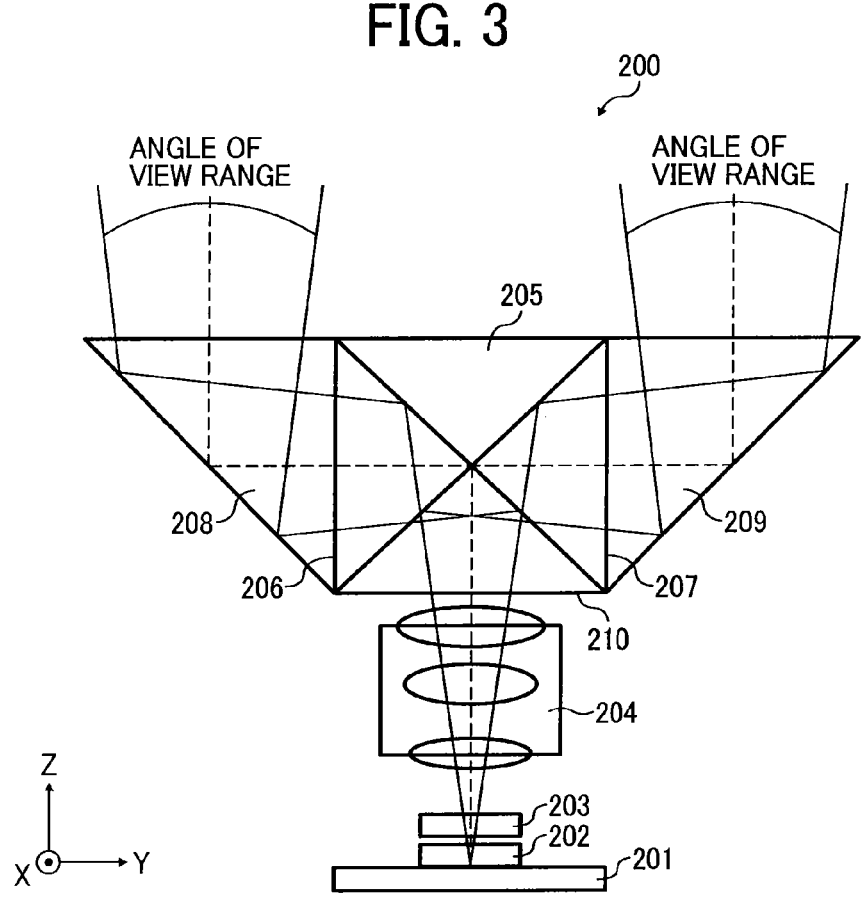
FIG. 3 schematically illustrates a structure of a stereo camera of Example 1.

FIGS. 2 and 3 illustrate a structure of a stereo camera of Example 1 according to the example embodiment. As illustrated in FIG. 3, in a stereo camera 200, an image capturing element 202 such as an image sensor is embedded on a substrate 201, and an optical filter 203 is arranged on the image capturing element 202 with a closely-contact manner. Information of an object is captured via an imaging lens 204. A light-selection-type cross prism 205 is arranged in front of the imaging lens 204. Further, two triangular prisms 208, 209 are adjacently provided at left and right on side surfaces 206, 207 of the light-selection-type cross prism 205, respectively.

In the stereo camera 200, a region-division-type light-separation filter that extracts blue-light information and red-light information in units of pixel is employed as the optical filter 203. Further, the light-selection-type cross prism 205 is arranged in front of the imaging lens 204, and two prisms 208, 209 are arranged adjacent to the cross prism 205. The prisms 208, 209 have a total reflection surface that reflects light from a + (positive) Z direction in a Y-axis direction. The light-selection-type cross prism 205 reflects light of a red-light component that is incident onto the side surface 206 from a − (negative) Y direction in a direction of a side surface 210, and light of a blue-light component that is incident onto the side surface 207 from a + (positive) Y direction in a direction of the side surface 210. With this configuration, red light in the − (negative) Y direction, and blue light in the + (positive) Y direction can be extracted.

The stereo camera 200 illustrated in FIGS. 2 and 3 can capture blue light image and red light image in the + (positive) Z direction at the same time. Further, as is clear from FIG. 3, since there is a certain distance between light beam effective ranges of the prisms 208, 209 provided left and right, it is possible to form a parallax image from the blue light images and the red light images that the light paths are corresponded to each other.

In this configuration, two light paths can be synthesized in front of the lens 204 and passes only one lens. With this configuration, even if the lens property fluctuates due to temperature, the lens position fluctuates, or the sensor position fluctuates, the two images fluctuate with the same amount, with which an effect of the fluctuation can be cancelled, and a stereo camera having enhanced environment-resistant can be devised. Further, only one set of an imaging lens and an image sensor is needed, and therefore, it is possible to reduce the cost. Further, even if the positional relationship of the image capturing element and the lens may fluctuate, the left and right images fluctuate in the same manner, with which an effect of the fluctuation can be cancelled theoretically. The stereo camera of the example embodiment can capture images with distance information to an object.

Compared to a conventional stereo camera in which two sets of a single image sensor and a single lens are arranged in parallel, only one set of an imaging lens and an image capturing element such as an image sensor is used for the example embodiment, with which, it is possible to reduce the cost.

Further, in conventional stereo cameras, an error occurs in distance measurement due to a change in a base line length caused by thermal expansion of a housing that supports a gap between lenses, or the like. However, in the stereo camera of the example embodiment, only one imaging lens is included, and a prism corresponding to a supporting member has a small coefficient of thermal expansion compared to metal, with which it is possible to suppress an influence of the change in the base line length to the distance measurement.

The above structure can be made using a prism filled with a medium such as glass or the like as above described. As described later, a similar structure can be made using a combination of mirrors and dichroic mirror of cross shape. In this structure, that an angle of view of a lens is not narrowed, and it is necessary that each mirror receives light with the angle as it is. Therefore, the light superimposing becomes extremely large. Therefore, it is important to use a structure that a space from a mirror surface, which is a face that light coining from an object, positioned a long distance, reflects for the time, to a next mirror surface is filled with a medium having a high refractive index so that the apparatus can be compact in size.

Figure 4:
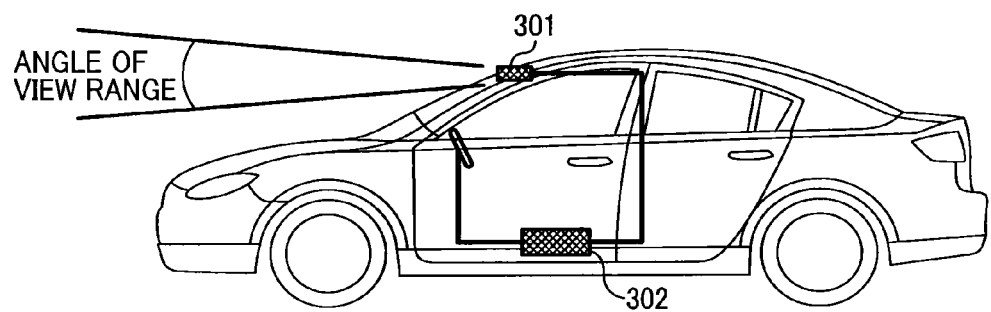
FIG. 4 schematically illustrates an example in which a stereo camera is mounted on a vehicle.

The stereo camera according to the example embodiment can be used for recognizing a region ahead of a vehicle as illustrated in FIG. 4, for example. A device for recognizing a region ahead the vehicle includes a stereo camera 301 and a signal processor 302. The stereo camera 301 is placed around a rear-view mirror inside a front window of the vehicle, and the signal processor 302 issues a warning to a driver or performs control of the vehicle based on information from the stereo camera 301. As a method of issuing a warning to a driver, obstacle information is informed by sound or the like by use of a speaker. As the control of the vehicle, the speed of the vehicle is reduced in a case where there is an obstacle. By using the stereo camera of the example embodiment, it is possible to obtain not only image information ahead the vehicle, but also distance information to a vehicle ahead or a pedestrian, and in a case where there is an obstacle, it is possible to secure a safe drive by an early warning or the like issued to a driver.

When the stereo camera according to the example embodiment is placed in the vehicle, an object outside the vehicle is captured through a glass of a front window. In that case, distortion, uneven thickness, curvature, and the like of the front window are different between corresponding portions in the left and right, and there is a case that matching of images formed by light from the left and right cannot be performed properly. In order to cancel such effect, it is preferable to place only an image capturing element (image sensor) and a lens unit in the vehicle, and place a cross prism outside of the glass. With this configuration, the light from the left and right passes through the same portion of the front window, and an influence of the front window is received in the same way for the light from the left and right, and therefore, it is possible to perform matching of the image formed by the light from the left and right regardless of conditions of the front window.

Further, the stereo camera according to the example embodiment can be combined with a display device such as a television (TV), a movie projector, or the like that displays a three-dimensional image to human eyes by displaying different images with respect to left and right human eyes. As a result, it is possible to structure a three-dimensional image acquisition and display system that performs three-dimensional image acquisition and display. Human eyes are sensitive to a difference of rotation, size, deviation in the vertical direction, picture quality, or the like between the left and right images. Therefore, in conventional stereo cameras having two lenses, in a case of changing zooming or focusing, a complicated operation technique is needed to operate left and right lenses together so that deviations in optical axes, size of images, and focus between the left and right images do not occur.

On the other hand, in a structure according to the example embodiment of the present invention, light that forms two images having parallax is incident onto a single lens, and therefore, if zooming or focusing of the single lens is changed, the same change is entirely applied to an image viewed by the left and right human eyes. Therefore, it is possible to suppress the deviations in the optical axes, sizes of the images, and focus occurred by having two different optical characteristics in the left and right images, with which a natural stereoscopic image can be obtained. In a case where the optical system is configured to have a changeable structure for zooming, the structure according to the embodiment of the present invention is useful because accurate correction of characteristics of two lenses is extremely difficult.

Figure 5:
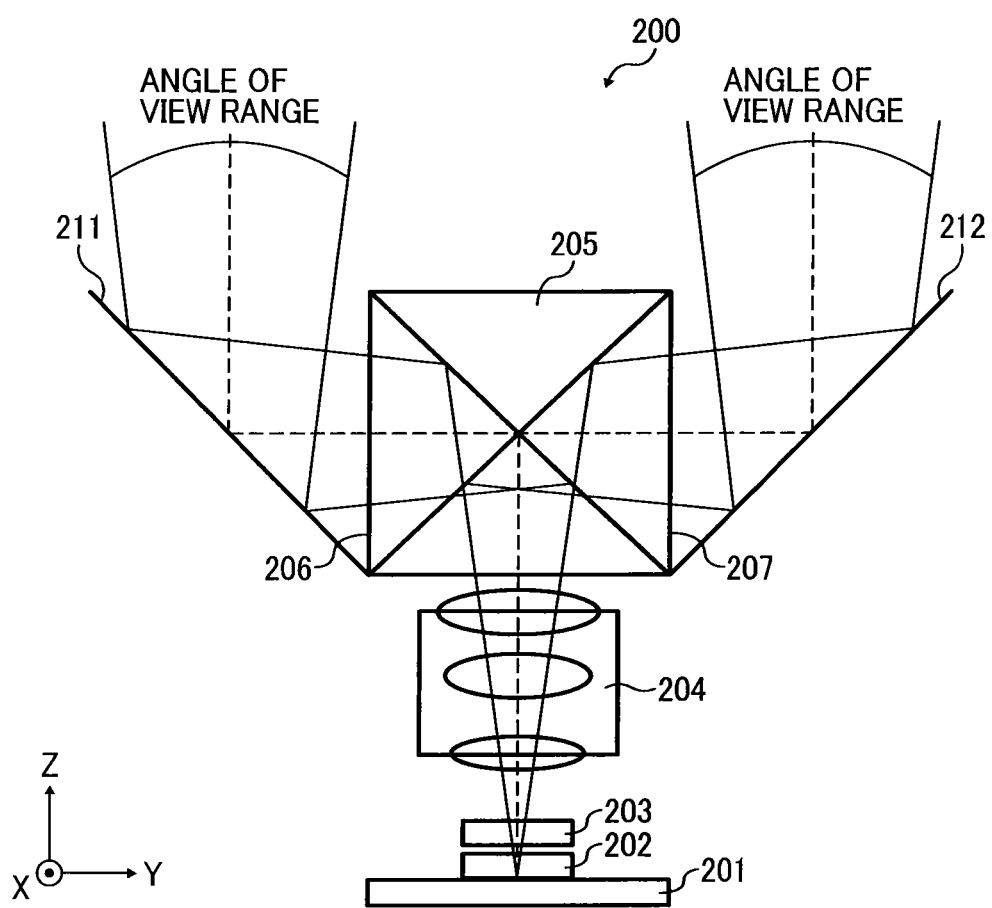
FIG. 5 schematically illustrates a structure of Modified Example 1 of Example 1.

Further, a structure of Modified Example 1 of Example 1 illustrated in FIG. 5 can be applied, in which the prisms 208, 209 in the structure illustrated in FIG. 3 is changed to mirrors 211, 21, in which because a phenomenon that an angle of incident light becomes shallow by a refractive index of a prism cannot be used, an optical layout becomes slightly larger.

Figure 6:
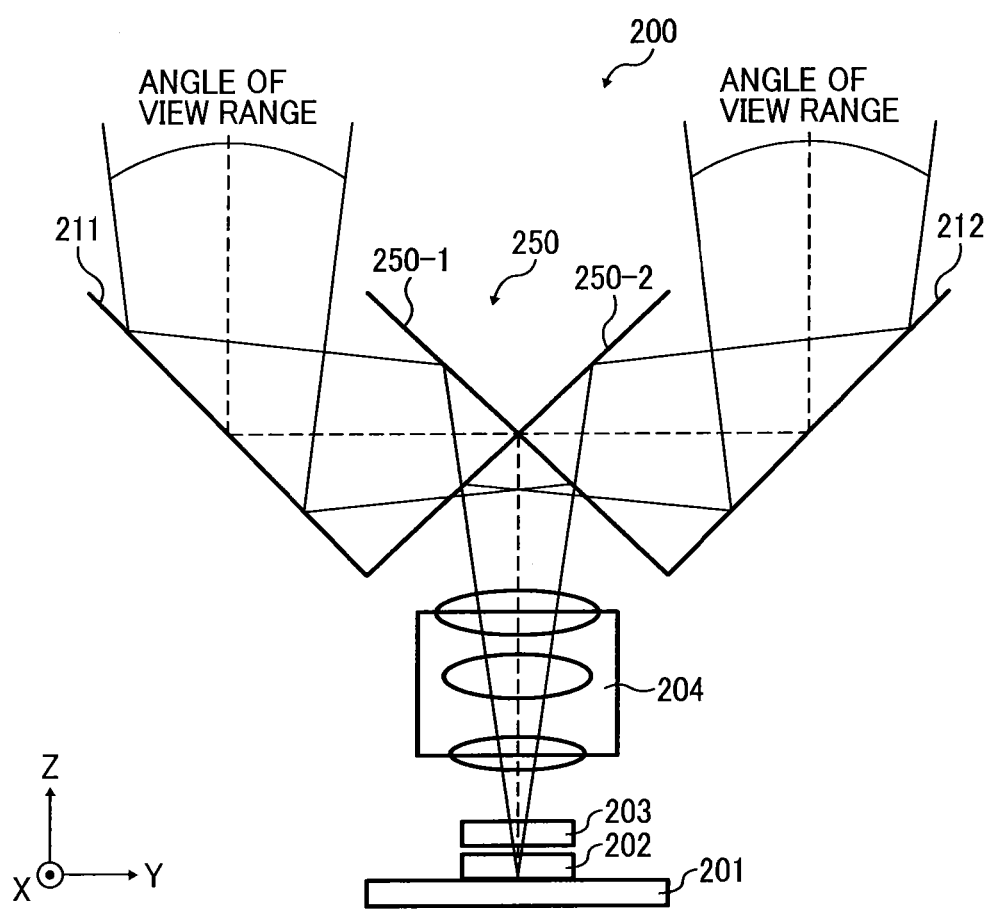
FIG. 6 schematically illustrates a structure of Modified Example 2 of Example 1.

Further, as shown as Modified Example 2 of Example 1 illustrated in FIG. 6, as to the cross prism 205 arranged in the center, not only a prism-shaped prism, but also a combination of dichroic mirrors 250-1, 250-2 arranged in a cross shape (light-selection-type cross mirror 250 in FIG. 6) can be used. In this case, because a phenomenon that an angle of incident light becomes shallow by a refractive index of a prism cannot be used, an optical layout becomes slightly larger. However, since an amount of glass materials to be used becomes smaller, it is possible to reduce the cost. Further, a structure that prisms are arranged in the left and right sides and a light-selection-type cross mirror is arranged at a central portion can be used.

Figure 7:
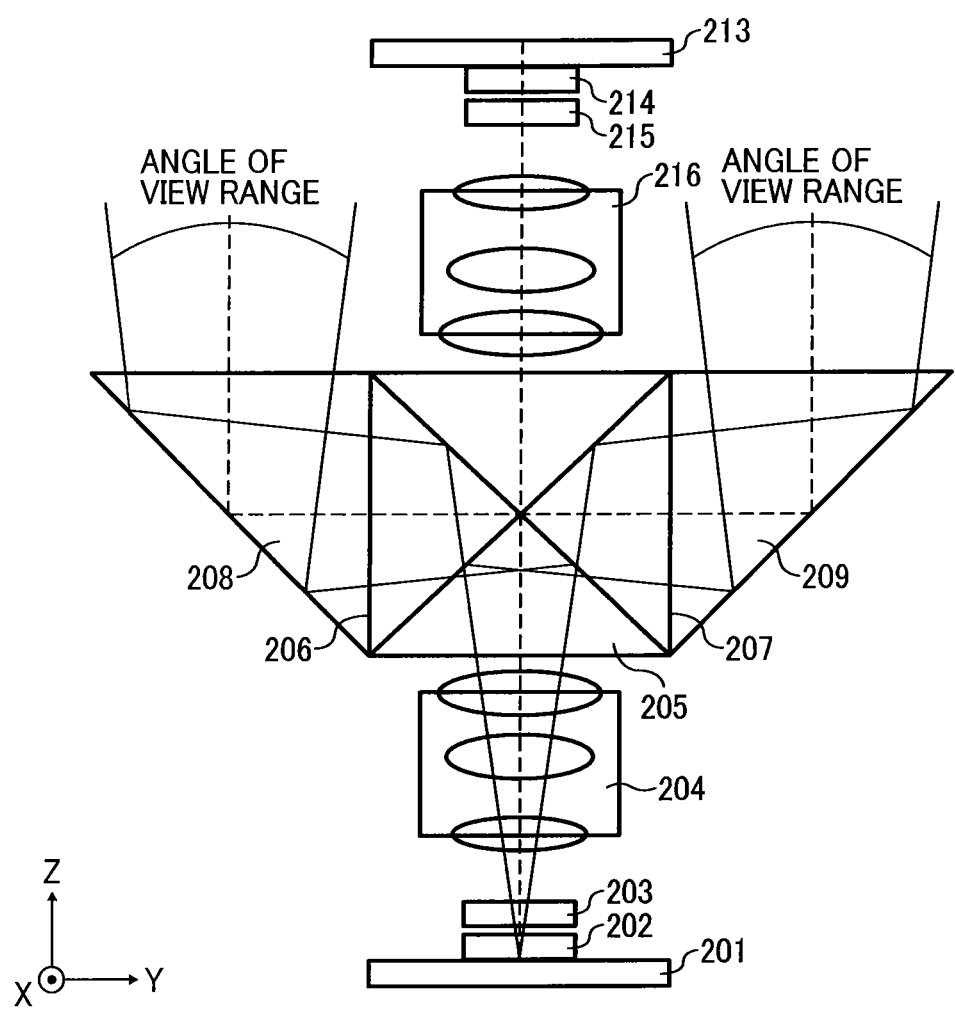
FIG. 7 schematically illustrates a structure of a stereo camera of Example 3.

A description is given of a stereo camera of Example 2 with reference to FIG. 7. FIG. 7 is a schematic a structure of a stereo camera of Example 2. A stereo camera 200 illustrated in FIG. 7 has sensor units above and below a light-selection-type cross prism 205. For example, an image capturing element 214 is used as a color image sensor, and an image capturing element 202 is used as a monochrome image sensor. Or the image capturing element 214 used as a high-resolution monochrome image sensor, and the image capturing element 202 used as a low-resolution color image sensor. Because spatial resolution of color information is not required to be higher than that of luminance information and distance information, a set of a high-sensitivity and high-resolution monochrome image sensor that can have high distance-measuring performance and a low-resolution color image sensor having sensitivity lower than that of the monochrome image sensor can be used. With this configuration, it is possible to obtain high distance-measuring performance from a bright scene to a dark scene, and color information at the same time. Further, in this case, because optical axes are corresponded in the left and right, it is easy to perform calibration.

Figure 8:
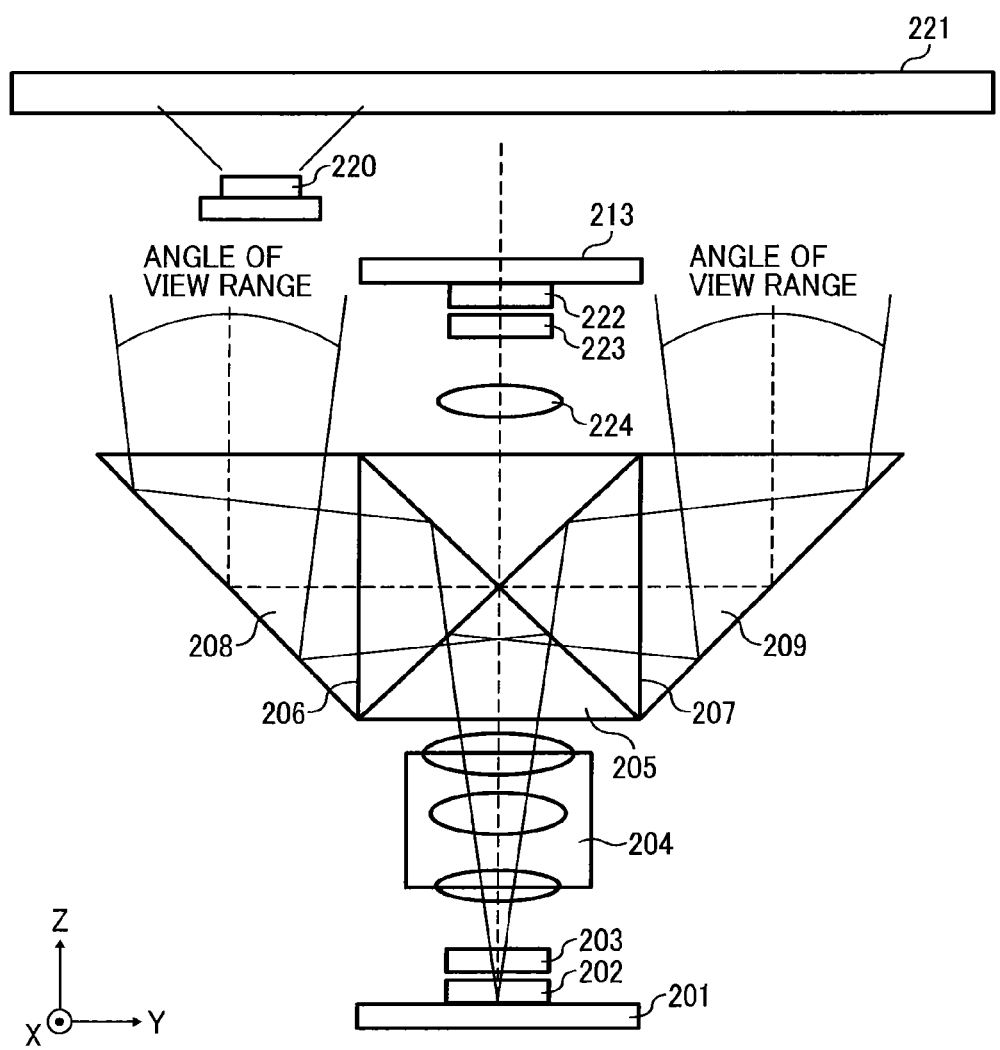
FIG. 8 schematically illustrates a structure of a stereo camera of Example 3.

A description is given of a stereo camera of Example 3 with reference to FIG. 8. FIG. 8 is a schematic structure of a stereo camera of Example 3. A stereo camera 200 illustrated in FIG. 8 has a raindrop detection function. Light emitted from a light source 220 of an light emitting diode (LED) infrared light is projected onto a windshield 221, and a raindrop on the windshield 221 can be detected by receiving the reflected light via a filter 223 that can pass through only light of wavelength of the projected light added onto an upper surface of an sensor. Because an entire windshield is used as a detection area, it is possible to perform high-sensitivity raindrop detection. In order to improve accuracy, it is important that a detection area can be large. By using an upper portion of FIG. 8, it is possible to perform detection on an entire image plane without interfering with the stereo camera. Further, in order to perform detection, only a sum of light amount of the reflected light in the entire image is needed, and therefore, it is not always necessary to use an image capturing element for detection, and resolution of a lens for raindrop detection is not needed. Accordingly, there is no problem with a structure using one photodiode (PD) 222, a simple lens (for example, a single lens) 224, and the like.

Figure 9:
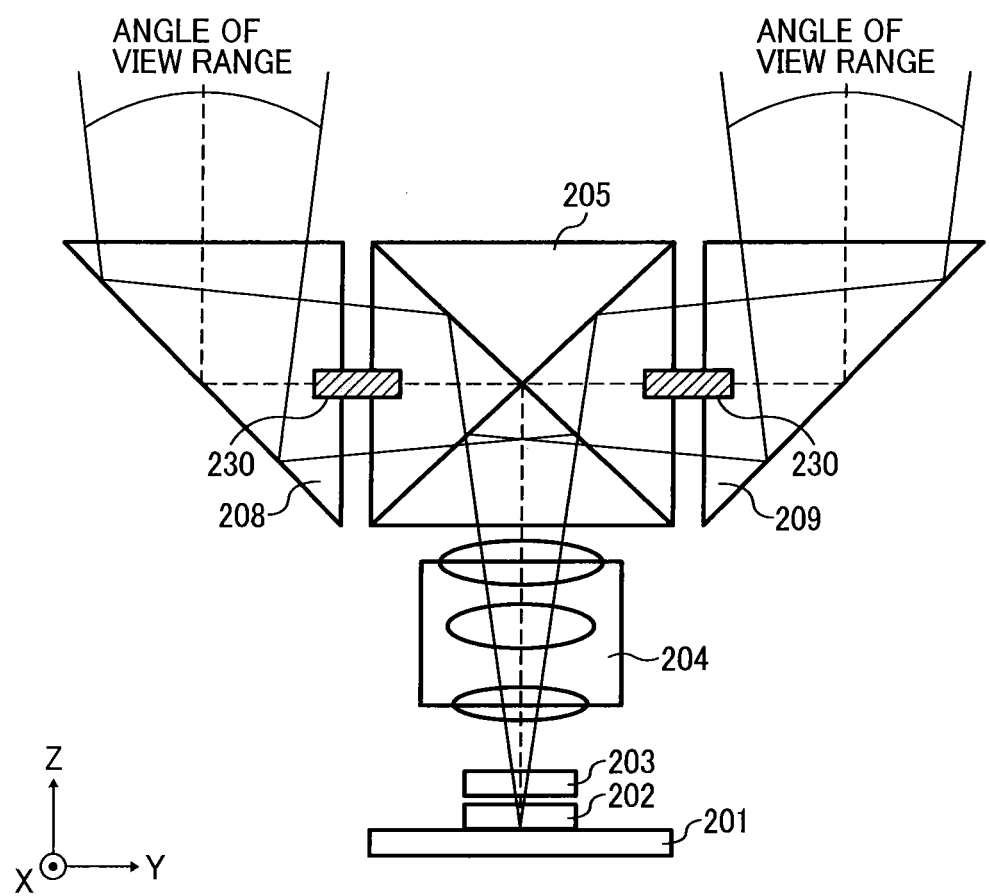
FIG. 9 schematically illustrates a state where a gap between a cross prism and a prism is maintained.

A description is given of fixation of a stereo camera. Gaps between the cross prism 205 and each of the prisms 208, 209 can be fixed with an adhesive agent. In order to correspond light beams of the left and right, it may be necessary to adjust angles of the prisms, in which a slight gap exists between the cross prism 205 and each of the prisms 208, 209. In this case, as illustrated in FIG. 9, it is preferable to fix the cross prism 205 and each of the prisms 208, 209 with a holding member 230 that holds the gap between the cross prism 205 and each of the prisms 208, 209. In a case where the holding member 230 is metal, a coefficient of thermal expansion of the metal is extremely large compared to glass that mainly composes the prisms 208, 209. Therefore, it is preferable that the holding member 230 can be as short as possible to fill the gap illustrated in FIG. 9. Further, if possible if the holding member 230 is made of glass having a small coefficient of thermal expansion, environment resistance against temperature change can be enhanced.

Figure 10A:
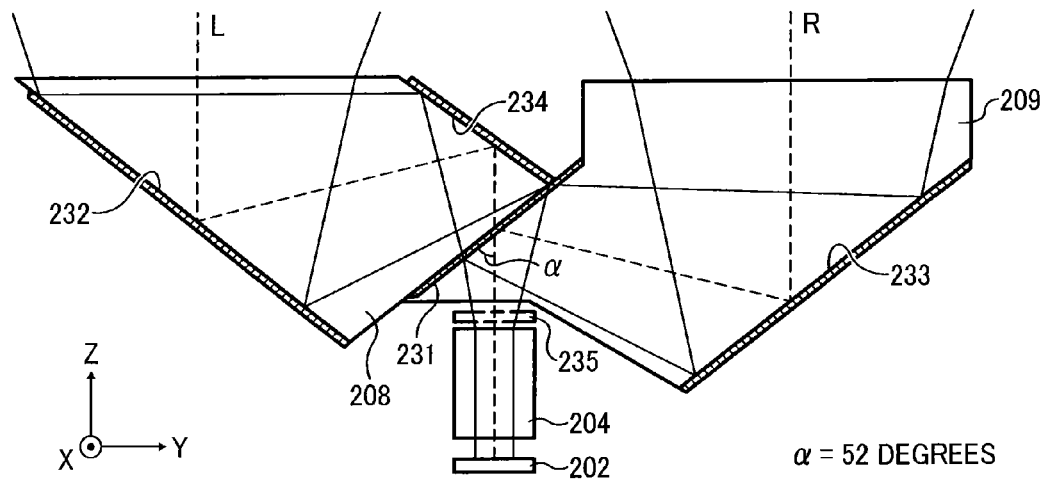
FIGS. 10A and 10B schematically illustrate a structure of a stereo camera of Example 4.
Figure 10B:
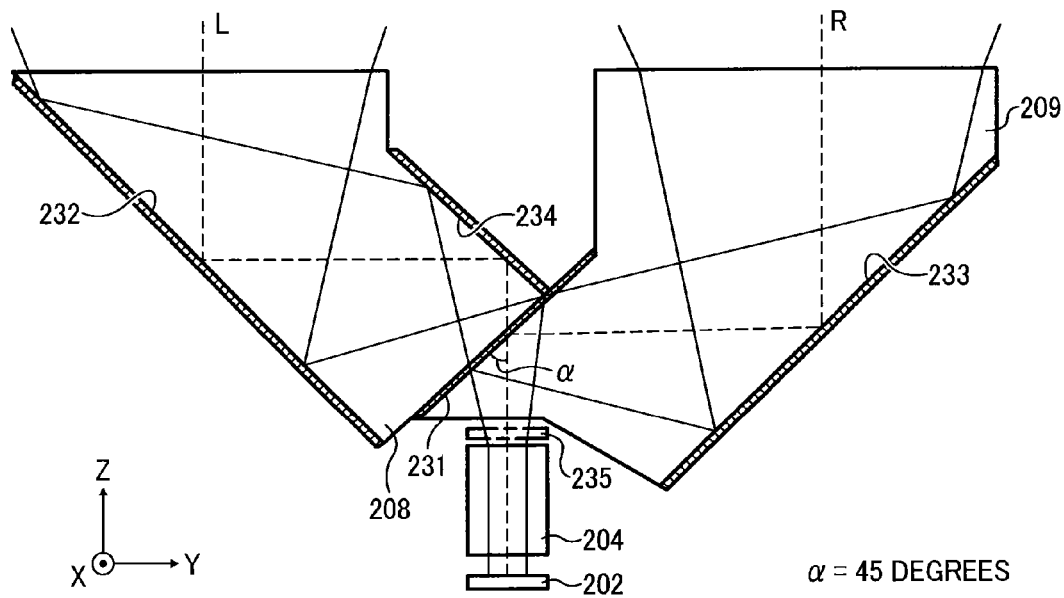

A description is given of a stereo camera of Example 4. FIGS. 10A and 10B illustrate schematic structures of a stereo camera of Example 4. In Example 4, instead of using the light-selection-type cross prism or the light-selection-type dichroic mirror used in Examples 1 to 3, dichroic mirror and mirror surfaces (reflecting surfaces) are used. This structure can solve a problem of difference in light path length occurring in the light paths of the light from the left and right in Example 1. In the structure in Example 4, light path lengths of light from the left and right (left light referred to as light L, and right light referred to as light R in FIG. 10) are substantially the same. Therefore, as same as other stereo cameras, it is possible to obtain parallax by only searching pixels in a horizontal or lateral direction for parallax calculation. Further, different from a structure using a cross prism, the structure of Example 4 employs one dichroic mirror and mirror surfaces. Therefore, deficiency portion (gap) in the center of the image does not exist, and a process of filling the gap (to be described later) is not required. The light R (one light) is reflected by a mirror surface (reflecting surface) 233, and further, the light R (blue light) is reflected by a dichroic mirror 231. The light L (the other light) is reflected by each of mirror surfaces 232, 234, and the light L (red light) is transmitted through the dichroic mirror 231. Then, the blue light and the red light are combined, and become incident onto the imaging lens 204, and focused as an image on the image capturing element 202. The light L and the light R have the same light path length with each other. The dichroic mirror 231 may be, for example, a multi-layer film.

Further, in Example 4, in order to make an optical system smaller, an angle α between a light beam in the center of an angle of view and a dichroic mirror and a mirror surface is set greater than 45 degrees. FIG. 10A illustrates a case that the angle α between the light beam in the center of the angle of view and the mirror surface of the dichroic mirror 231 is set 52 degrees, wherein light is reflected by or transmitted through the dichroic mirror 231. FIG. 10B illustrates a case that the angle α is set to 45 degrees. In the case that the angle α is set to 45 degrees as shown in FIG. 10B, compared to the case that the angle α is set to 52 degrees as shown in FIG. 10A, a light beam at an end of an angle of view of the imaging lens 204 spreads widely in the left and right direction in the drawing. In order to cover the light beam that spreads widely in the left and right direction, the size of prism becomes greater. That is, by setting the angle α between the light beam in the center of the angle of view and the dichroic mirror and the mirror surface to be greater than 45 degrees, the size of the prism can be set smaller. An upper limit value of the angle α is 90 degrees. However, in a case that the upper limit value of the angle α is 90 degrees, the size of the prism becomes greater than the case that the angle α is 45 degrees. Therefore, an optimal value depends on an angle of view of a lens. Furthermore, as illustrated in FIG. 10A, an optical aperture 235 is placed near the prism.

Figure 11:
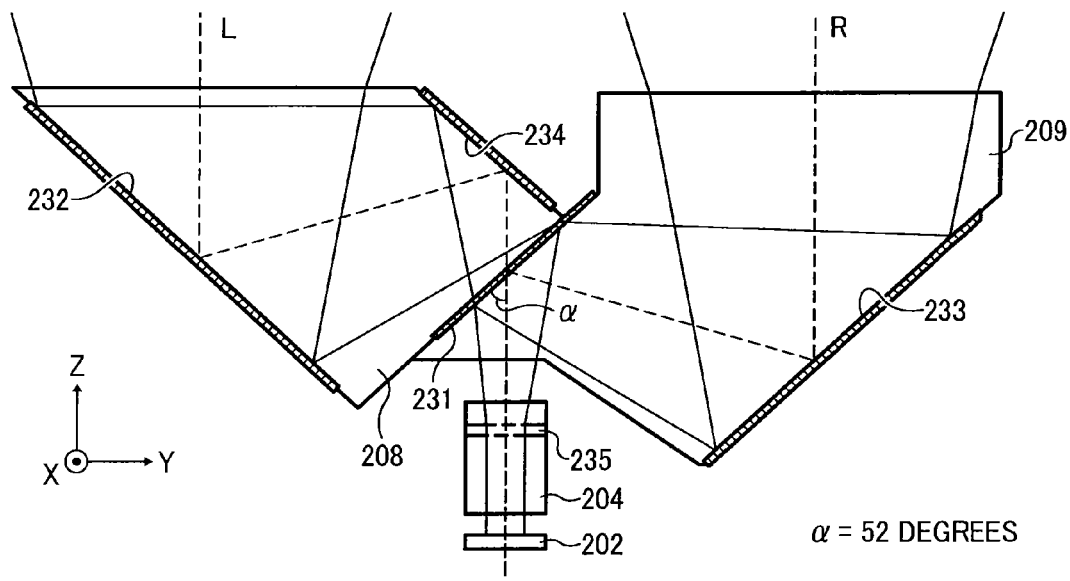
FIG. 11 is a schematic diagram in a case where an optical aperture is arranged inside an imaging lens.

Further, as shown in FIG. 11, the optical aperture 235 can be disposed inside the imaging lens 204. When the optical aperture 235 is disposed in the imaging lens 204 as shown in FIG. 11, a light beam already spreads depending on the angle of view with respect to the prism, and the size of the prism becomes larger compared to the prism in a case of disposing the optical aperture 235 shown in FIG. 10A. It is preferable that the optical aperture is positioned in front of the imaging lens, which is closer to the prism, which may be referred to as a front aperture position.

In addition to the above configuration, light of the infrared wavelength range may pass through the color filter on the image capturing element for any color light such as blue light and red light. Therefore, by disposing an infrared cut-filter between the imagine lens and the image capturing element, a crosstalk between the left and right images can be reduced. The position of the infrared cut-filter is not limited between the imagine lens and the image capturing element as long as the infrared cut-filter is disposed between the object and the image capturing element. Further, to correct a difference of transmission light quantity due to the difference of transmission ratio of the optical filters at the left and right, a neutral density filter can be disposed in the path of one of the left and right light.

Figure 12:
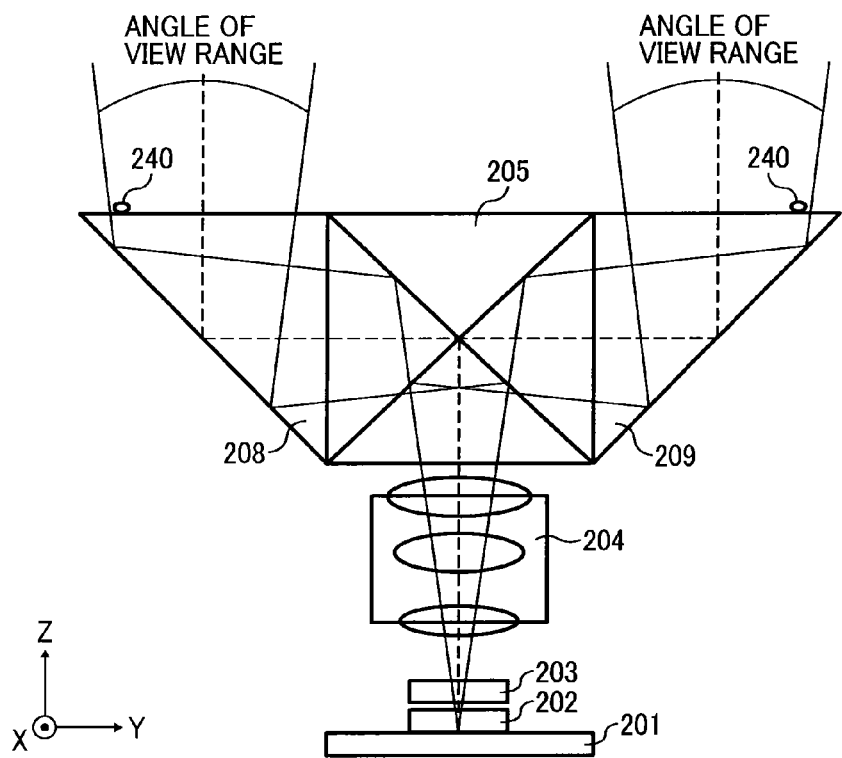
FIG. 12 is a schematic diagram that explains calibration.

A description is given of corresponding positions of images of the left and right cameras using an alignment mark. In this structure, as a marker used for corresponding light beams incident onto a lens, as illustrated in FIG. 12, it is preferable to provide an alignment marker 240 on the cross prism 205, or prisms 208, 209 which are one the light paths. The alignment marker 240 can be some sort of seal, or can be colored. Because it is preferable to form an image of the alignment marker 240 on the image sensor, the alignment marker 240 preferably have curvature. By using this alignment marker 240, it can easily perform calibration at the time of production, and in addition, it can perform detection in a case that a positional relationship in the left and right fluctuates due to some environmental change or shock while using, with which serious accidents such as mistakenly putting on a brake or the like can be prevented.

Figure 13A:
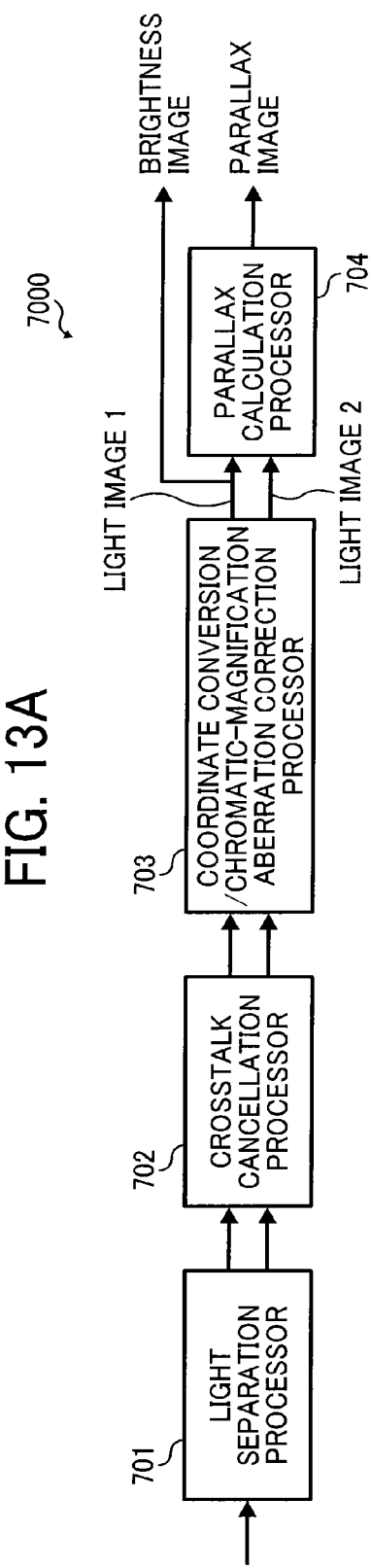
FIGS. 13A and 13B are block diagrams of an image processor in a color sensor.
Figure 13B:
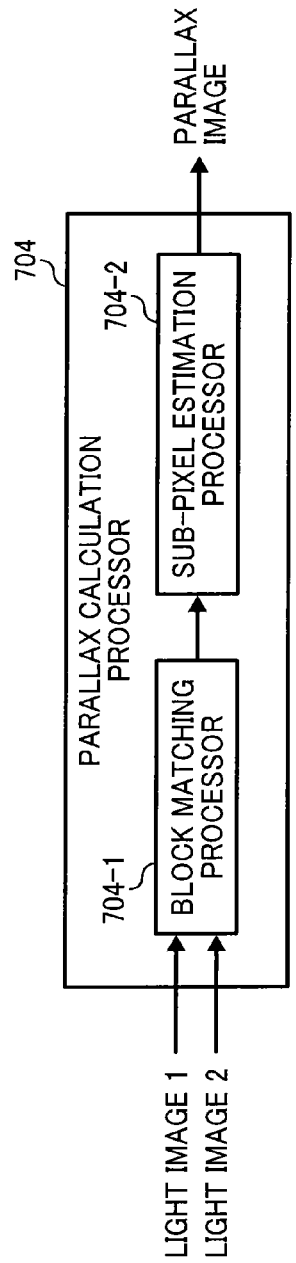

A description is given of an image processor. FIGS. 13A and 13B are block diagrams that illustrate a structure of an image processor for a color sensor. FIG. 13A illustrates an overall structure, and FIG. 13B illustrates a parallax calculation processor. In an example embodiment, the color sensor uses a color filter of Bayer arrangement typically used for color filters, but other color filter arrangement can be used.

In FIG. 13A, an image from an image capturing element such as an image sensor is input to a light separation processor 701, and divided into a light image 1 and a light image 2 by the light separation processor 701. For the simplicity of description, the light image 1 is referred to as an image composed of red pixels of a red filter of the image sensor, and the light image 2 is referred to as an image composed of blue pixels of a blue filter of the image sensor. As illustrated in FIG. 14, in the light separation processor 701, pixels of the red-light component is extracted from an entire input image pixel by pixel to form a red-image, which is referred to as the light image 1. Further, pixels of the blue-light component are extracted from the entire input image by pixel by pixel to form a blue-image, which is referred to as the light image 2.

Figure 13C:
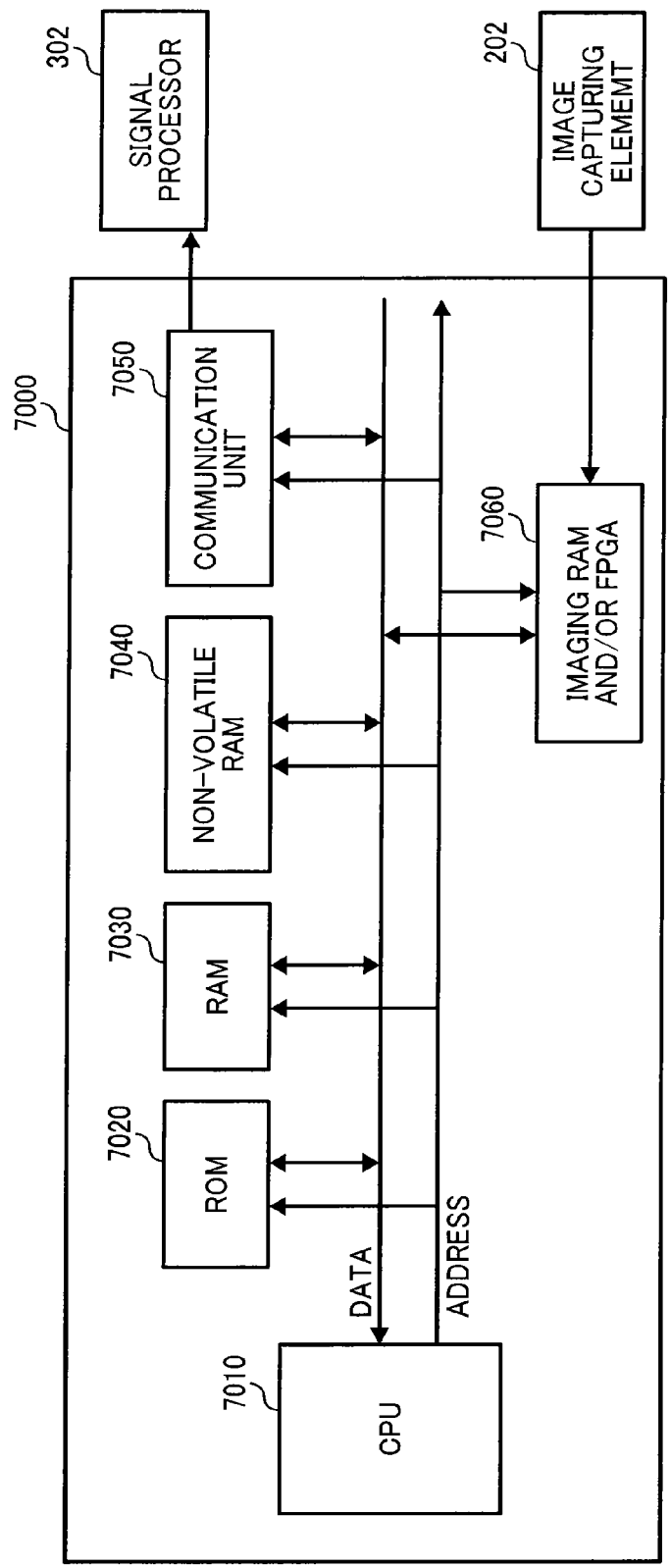
FIG. 13C is a schematic configuration of an image processing apparatus of FIG. 13A.

FIG. 13C is an example configuration of a hardware of the image processor 7000 of FIG. 13A. The image processor 7000 includes, for example, a central processing unit (CPU) 7010, a read only memory (ROM) 7020, a random access memory (RAM) 7030, a non-volatile RAM (NVRAM) 7040, a communication unit 7050, and an imaging RAM and/or field programmable gate array (FPGA) 7060. The ROM 7020 stores programs executable by the CPU 7010. The RAM 7030 is used as a working memory when executing the programs. The NVRAM 7040 stores adjustment values such as calibration values of camera, and can retain data even when the power-supply is shutdown. The communication unit 7050 is used to transmit a recognition result to the signal processor 302 (FIG. 4). The imaging RAM stores image data obtained by the image capturing element 202 temporally and the FPGA processes image data. These units are known units, thereby the explanation is omitted. The FPGA can be programmed using programs stored in the ROM 7020 and data stored in the ROM 7020. Each of process functions of the image processor of FIG. 13A can be devised as software or hardware using the programmed FPGA. Specifically, data obtained by the image capturing element 202 is stored in the imaging RAM, and the CPU 7010 processes the data using programs stored in the ROM 7020 to devise each of process functions of the image processor. Further, each of process functions of the image processor can be devised using a hardware such as the FPGA programmed to execute each of process functions of the image processor. The image processor 7000 shown in FIG. 13C can be included in the camera 301 (FIG. 4), and transmits a process result to the signal processor 302. Further, the image processor of FIG. 13C can be included in the signal processor 302 instead of the camera 301.

Further, in a case that parallax calculation is actually performed with respect to the image that is outputted as it is, because corresponding positions in a red light image and a blue light image are shifted by one pixel in the vertical direction and the horizontal direction, an error may occur on an edge or the like. Therefore, in the light separation processor 701, it is preferable to output an image having corresponding red-color pixels and blue-color pixels with respect to entire pixels by interpolating in-between pixels. For example, vacant position pixels can be allocated by a linear interpolation. As a result, an output image can output an image having corresponding red color pixels and blue color pixels for the entire pixels. This can be conducted by conducting Bayer interpolation conducted for the color image sensor of Bayer arrangement. In the Bayer interpolation, RGB image data of Bayer arrangement, converted to digital signals, is input, and image data of entire coordinate positions are generated for each of RGB by conducting the linear interpolation.

FIGS. 15A, 15B and 15C show examples of color filter of Bayer arrangement, in which G0 is obtained using following formula (1).

$$G0 = (G2 + G4 + G6 + G8)/4 \quad (1)$$

Further, R2, R4, R6, R8, R0 can be obtained using following formulas.

$$R2 = (R1 + R3)/2 \quad (2)$$

$$R4 = (R3 + R5)/2 \quad (3)$$

$$R6 = (R5 + R7)/2 \quad (4)$$

$$R8 = (R1 + R7)/2 \quad (5)$$

$$R0 = (R1 + R3 + R5 + R7)/4 \quad (6)$$

Further, B2, B4, B6, B8, B0 can be obtained as similar to the R2, R4, R6, R8, R0. Therefore formulas for B2, B4, B6, B8, B0 are omitted.

Although the image capturing element uses a RGB color filter of Bayer arrangement but other image capturing element having other color filter using other CMYK and RGB+ Ir (infrared) arrangement can be used. Compared to three color type such as RGB, an image capturing element having four color filter arrangement requires a low latency memory or four-port RAM for chromatic-magnification aberration correction. In the chromatic-magnification aberration correction, RGB image data having received the Bayer interpolation is input, and coordinate conversion is conducted for each of RGB component using a given polynomial expression (coordinate conversion of chromatic-magnification aberration correction). In the chromatic-magnification aberration correction, the input RGB image data is converted to data R'G'B' having a wavelength range different from a wavelength range of color filter of the image capturing element, and then the coordinate of data is converted. Then, the chromatic-magnification aberration correction is conducted, and then the data is converted to RGB data having the wavelength range of original color filter (inverse conversion) and then output. With this configuration, even if chromatic difference of magnification at the peripheral of the image is great, high quality image can be obtained. Further, by conducting coordinate conversion to only R' and B', the circuit size can be reduced. Further, a low capacity and low latency memory or a low capacity memory having a plurality of ports (SRAM) can be used for coordinate conversion of chromatic-magnification aberration correction.

Figure 16A:
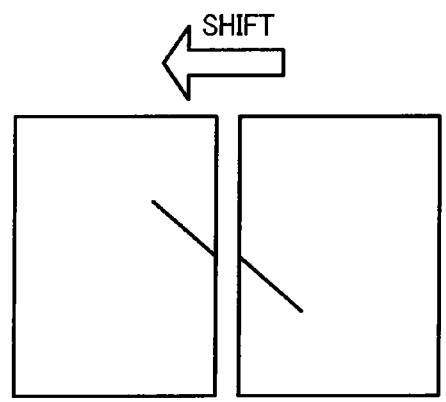
FIGS. 16A and 16B are diagrams that explain processing that fills a gap between prisms of a cross prism.
Figure 16B:
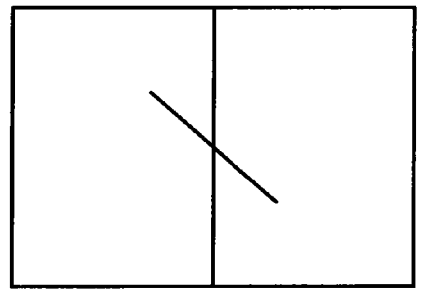

As shown in FIG. 16A, there is a case that a gap between prisms in a cross prism causes an area where an image does not exist in the vicinity of the center of an image. Therefore, processing that fills the gap is required. As illustrated in FIG. 16A, an image on the right in the screen is shifted to the left to fill the gap as illustrated in FIG. 16B. An area where the image does not exist is different due to difference of each one of structures. Therefore, it is preferable to prepare a parameter for which portion to be filled for each one of structures. The gap filling is preferably performed after a coordinate conversion/chromatic-magnification aberration correction processor 703. If the gap filling is performed before the coordinate conversion/chromatic-magnification aberration correction processor 703, non-consecutive points are needed in coordinate conversion, which is difficult to be implemented.

A description is given of crosstalk cancellation performed by a crosstalk cancellation processor 702 shown in FIG. 13A. Ideally, left and right images are formed on the image sensor as red light and blue light, and the left and right images are completely separated by an optical filter on the image sensor. However, actually, due to a characteristic of an optical filter disposed for a cross prism, even in a case where only red light is supposed to be reflected, not only red light but also blue light is partially reflected, and vice versa. Further, the color filter disposed on the pixel of the image sensor does not have a sharp wavelength characteristic that can bock a certain wavelength completely. Therefore, a faint left image is superimposed on a right image, or a faint right image is superimposed on a left image. This is called as a crosstalk hereinafter. When the separated light is used, due to the characteristic of the optical filter formed on the image sensor, intrusion of the wavelength of the left image in the right image cannot be prevented completely. Therefore, the crosstalk effect becomes great between the left and right images and distance measurement error becomes great. Therefore, the following crosstalk cancelling process is effective.

Figure 17:
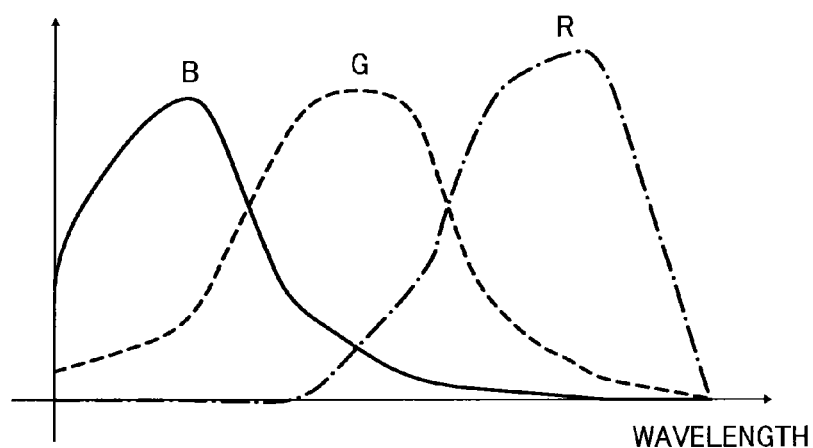
FIG. 17 is a characteristics chart of spectrum properties of a color filter on an image sensor.

Further, FIG. 17 shows spectrum characteristic of color filter on the image sensor, in which when the blue (B) pixel and the red (R) pixel are used, a wavelength that can have a transmittance for both of the blue (B) pixel and the red (R) pixel exist, with which crosstalk occurs between the left and right images. Therefore, the crosstalk cancelling process is effective to enhance distance measurement precision. The crosstalk can be cancelled by computing following formulas for the obtained left and right images $$R = Rin - cc * Bin \quad (7)$$

$$B = Bin - cc * Rin \quad (8)$$

$$R\text{crosstalkcancel} = R*(1+cc)/(1-cc^2) \quad (9)$$

$$B\text{crosstalkcancel} = B*(1+cc)/(1-cc^2) \quad (10)$$

In the above formulas (7) to (10), cc is crosstalk cancellation coefficient, Rin and Bin are input signals, and Rcrosstalkcancel and Bcrosstalkcancel are red light and blue light component signals having cancelled the crosstalk. Because a crosstalk amount may be different depending on a location on an image, it is preferable to have a table of amounts of cc in accordance with the location on the image plane.

A basis of the above formulas is explained as below. In each pixel, due to the crosstalk, the following signals are input.

$$Rin = (1 \times c) * Rori + c * Bori \quad (11)$$

$$Bin = (1 \times c) * Bori + c * Rori \quad (12)$$

In the above formulas (11) and (12), c is crosstalk amount, Rin and Bin are genuine input signals having no crosstalk. When the formula (11) is substituted in the formula (7), $$R = (1 \times c) * Rori + c * Bori - cc * Bin \quad (13)$$

And further, when the formula (12) is substituted in the formula (13), $$R = (1-c)*Rori + c*Bori - cc*((1-c)*Bori + c*Rori)$$

$$= (1-c)*Rori + c*Bori - cc*Bori + cc*c*Bori - cc*c*Rori$$

$$= (1-c-cc*c)*Rori + (c-cc+cc*c)*Bori$$

When c=cc/(1+cc) is applied, $$R = (1 - cc/(1+cc) - cc^2/(1+cc))*Rori$$

$$= (1-cc^2)/(1+cc)*Rori$$

Conversely, when Rori is solved, Rori=R*(1+cc)/(1−cc^2) is obtained, which is the same as the formula (9).

A description is given of coordinate conversion processing performed by the coordinate conversion/chromatic-magnification aberration correction processor 703 shown in FIG. 13.

In order to obtain higher distance-measuring performance, processing that corrects distortion of a lens is required, and correcting the distortion of the lens is performed by coordinate conversion processing. Parameters of distortion aberration correction amounts can be lens design values, or calibration of parameters can be performed one by one apparatus. Further, there is also a production error in a prism for combining wavelengths, which is placed in front of a lens. Therefore, in order to correct the production error, it is preferable to concurrently perform correction of external parameters performed in a general stereo camera in the coordinate conversion processing. Further, when separate light is used as described above, due to chromatic difference of magnification of lens, magnification of left and/or right lenses may vary. If the magnification variance is remained, distance measurement precision may decrease. Therefore, it is preferable to concurrently perform the chromatic-magnification aberration correction in the coordinate conversion processing.

Figure 18:
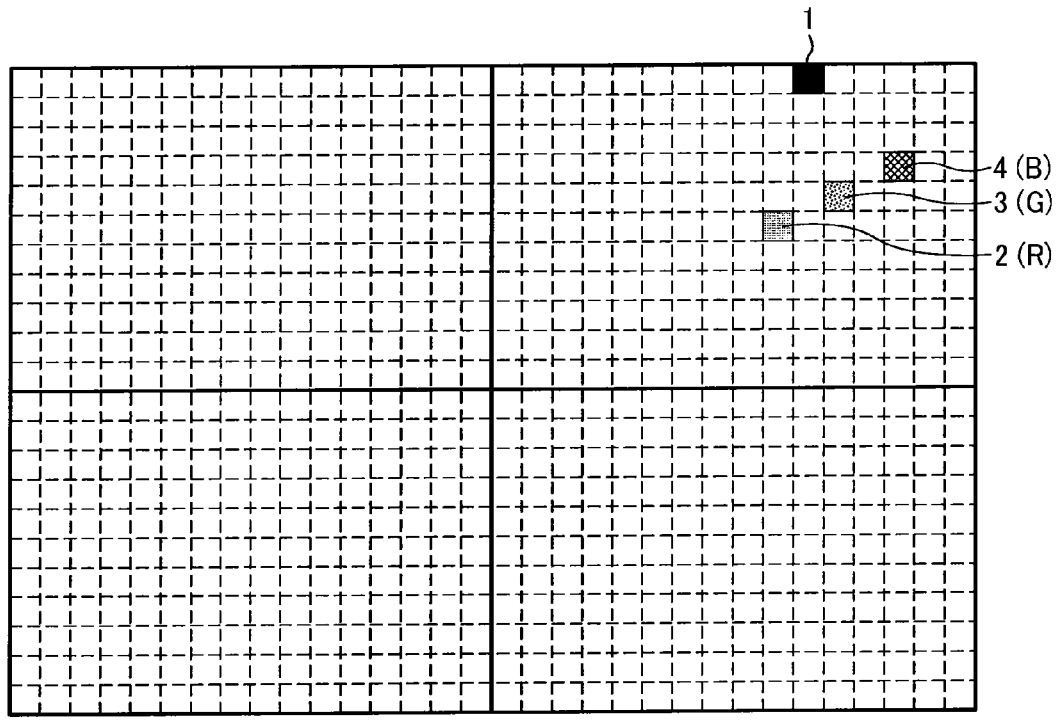
FIG. 18 is a diagram that explains an arrangement of a color filter and a light-separation filter.
Figure 19:
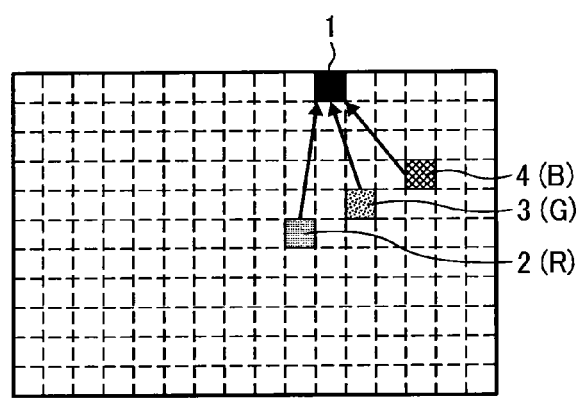
FIG. 19 is a diagram that explains a position actually imaged by an image capturing element such as an image sensor.
Figure 20A:
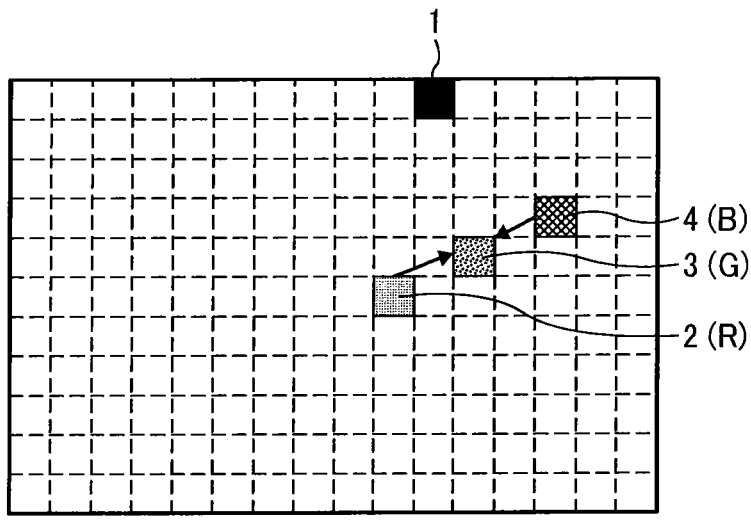
FIGS. 20A and 20B are diagrams of correction of chromatic-magnification aberration and distortion aberration, respectively.
Figure 20B:
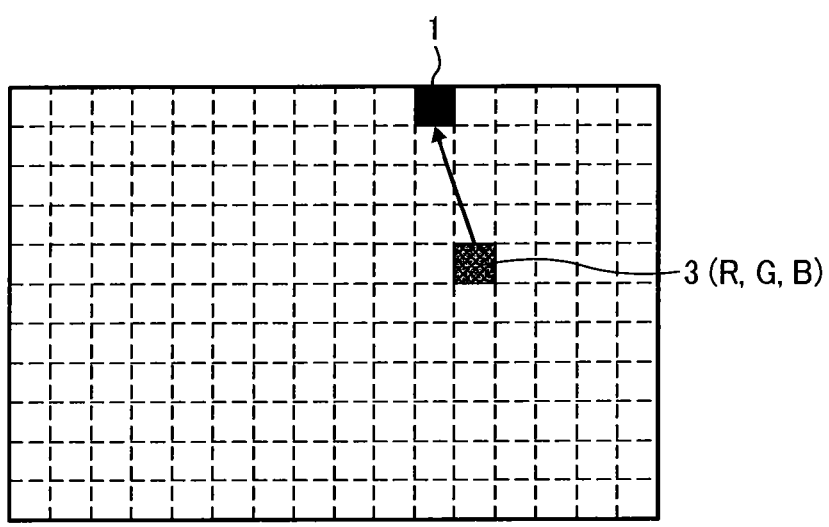

Firstly, as a specific example of the coordinate conversion processing, principles of chromatic-magnification aberration correction and distortion aberration correction are explained. In a case of a monochrome sensor, only the distortion aberration correction is performed, and in a case of a color sensor, in addition to the distortion aberration correction, it is preferable to also perform the chromatic-magnification aberration correction. As schematically illustrated in FIG. 18, in a case where an image capturing is performed by use of an optical system having chromatic-magnification aberration and distortion aberration, pixel data positioned at one position (pixel) denoted by reference number 1 in an upper right in FIG. 18 is shifted from the original position due to distortion. Further, due to chromatic-magnification aberration, each of RGB color components of the pixel data is differently shifted, and, as illustrated in FIG. 19, each of the RGB color components, actually captured by the image capturing element such as an image sensor, is positioned at a position denoted by each of reference numbers 2 (R), 3 (G), and 4 (B). In the chromatic-magnification aberration correction and the distortion aberration correction processing, as illustrated in FIGS. 20A and 20B, each RGB color component of the pixel data positioned at the position of 2 (R), 3 (G), and 4 (B) are copied at the position 1 of the original position, in which coordinate conversion is performed. In this coordinate conversion, each of the positions 2, 3, and 4 is a source coordinate of coordinate conversion, and the position 1 is a destination coordinate of coordinate conversion. The magnitude of distortion and the magnitude of chromatic-magnification aberration can be determined based on optical system design data. Therefore, it is possible to calculate a position shift of each RGB color component with respect to the original position. Then, based on data of coordinates of position, polynomial expressions and tables are prepared, and based on these information, distortion aberration and chromatic-magnification aberration of the input image can be corrected by the coordinate conversion processing.

Next, parallax calculation processing performed by a parallax calculation processor 704 (FIGS. 13A, 13B) is explained. Regarding the block matching processing, there are various methods as described below. In the example embodiment of the present invention, a luminance difference caused by light of reflected light of an object occurs in left and right images. Therefore, it is preferable to apply a normalization method in a block. With this processing, the luminance difference due to the light of reflected light can be cancelled, and only a pattern can be used for parallax calculation. In particular, it is preferable to use methods such as ZSAD, ZSSD, and ZNCC, which start with "Z" among the following methods.

(1) SAD (Sum of Absolute Difference)

SAD is a method in which matching between images is performed by subtracting a luminance value as it is. In SAD, calculation load is small.

$$R_{SAD} = \sum_{j=0}^{N-1} \sum_{i=0}^{M-1} |I(i, j) - T(i, j)| \qquad (14)$$

(2) SSD (Sum of Squared Difference)

SSD is a method in which matching between images is performed by subtracting a luminance value as it is in the same way as SAD. Unlike SAD, a square value is used as an error amount.

$$R_{SSD} = \sum_{j=0}^{N-1} \sum_{i=0}^{M-1} (I(i, j) - T(i, j))^2 \qquad (15)$$

(3) ZSAD (Zero Mean Sum of Absolute Difference)

ZSAD is a method in which an average value of each block is subtracted from the expression of SAD.

$$R_{ZSAD} = \sum_{j=0}^{N-1} \sum_{i=0}^{M-1} |(I(i, j) - \bar{I}) - (T(i, j) - \bar{T})| \qquad (16)$$

(4) ZSSD (Zero Mean Sum of Squared Difference)

ZSSD is a method in which an average value of each block is subtracted from the expression of SSD.

$$R_{ZSSD} = \sum_{j=0}^{N-1} \sum_{i=0}^{M-1} [(I(i, j) - \bar{I}) - (T(i, j) - \bar{T})]^2 \qquad (17)$$

NCC (Normalized Cross Correlation)

NCC is normalized cross correlation, and has a characteristic of being insusceptible to luminance and contrast.

$$R_{ZSSD} = \frac{\sum_{j=0}^{N-1} \sum_{i=0}^{M-1} I(i, j) T(i, j)}{\sqrt{\sum_{j=0}^{N-1} \sum_{i=0}^{M-1} I(i, j)^2 \times \sum_{j=0}^{N-1} \sum_{i=0}^{M-1} T(i, j)^2}} \qquad (18)$$

(5) ZNCC (Zero Mean Normalized Cross Correlation)

ZNCC is a method in which an average value of each block is subtracted from NCC.

$$R_{ZNCC} = \frac{\sum_{j=0}^{N-1} \sum_{i=0}^{M-1} ((I(i, j) - \bar{I})(T(i, j) - \bar{T}))}{\sqrt{\sum_{j=0}^{N-1} \sum_{i=0}^{M-1} (I(i, j) - \bar{I})^2 \times \sum_{j=0}^{N-1} \sum_{i=0}^{M-1} (T(i, j) - \bar{T})^2}} \qquad (19)$$

Figure 21A:
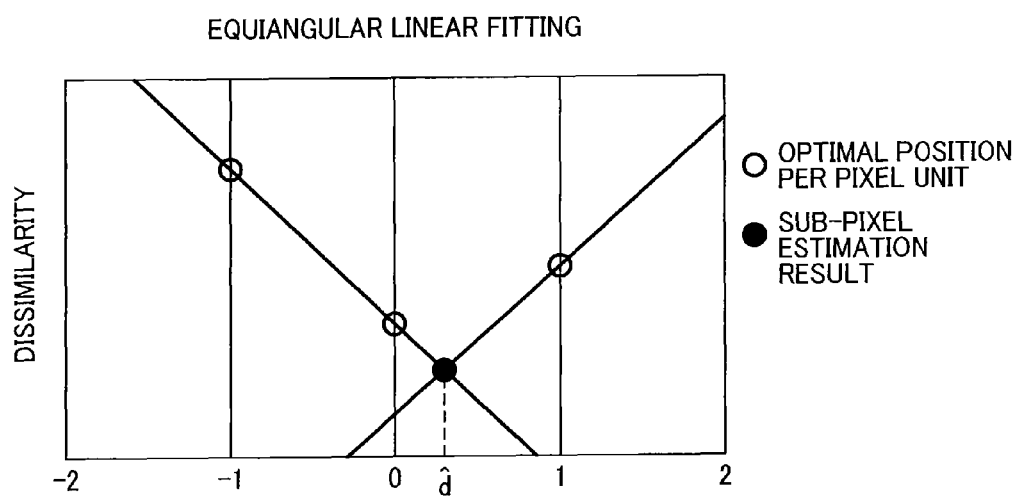
FIGS. 21A and 21B are characteristic charts indicating a relationship between a sub-pixel estimate value and a difference in equiangular linear fitting and parabolic fitting, respectively.
Figure 21B:
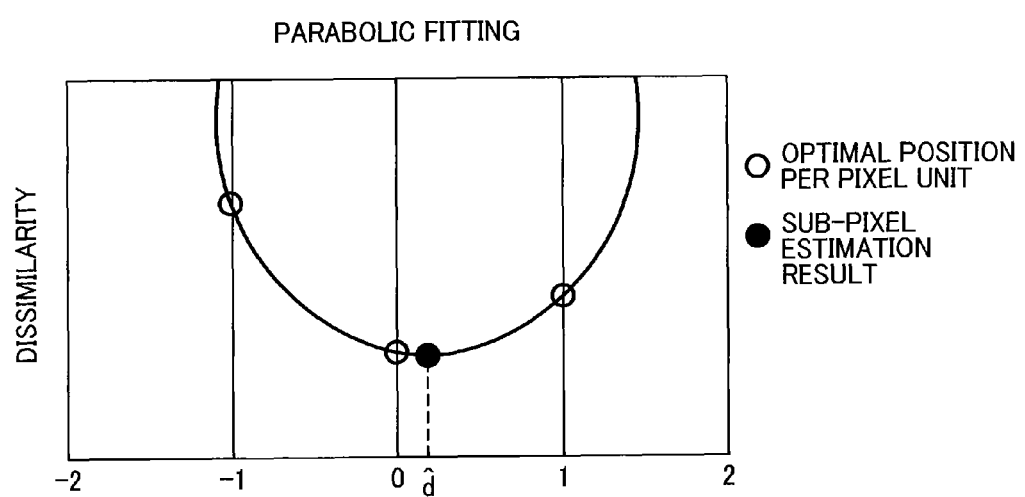

Next, sub-pixel estimation processing performed by a sub-pixel estimation processor 704-2 (FIG. 13B) is explained. In order to perform high-precision parallax calculation, the sub-pixel estimation processing that performs matching of a pixel equal to or smaller than one pixel is performed by equiangular linear fitting and parabolic fitting illustrated in FIGS. 21A and 21B.

In equiangular linear fitting, a sub-pixel estimation value is estimated as follows. Sub-pixel estimation value by equiangular linear fitting.

$$\hat{d} = \begin{cases} \frac{1}{2} \frac{R(1) - R(-1)}{R(0) - R(-1)} & R(1) < R(-1) \\ \frac{1}{2} \frac{R(1) - R(-1)}{R(0) - R(1)} & R(1) \geq R(-1) \end{cases} \qquad (20)$$

$R(d)$=dissimilarity function

In the parabolic fitting, a sub-pixel estimation value is estimated as follows. Sub-pixel estimation value by parabolic fitting $$\hat{d} = \frac{R(-1) - R(1)}{2R(-1) - 4R(0) + 2R(1)} \qquad (21)$$

The present invention provides the following Embodiments.

Embodiment 1

As described above, the stereo camera for measuring distance to an object using two images of the object having parallax is devised. The stereo camera includes an optical multiplexer to set a length of light path of each of the two images having different spectrum properties and parallax to the same length and to superimpose each of the light paths to one light path; an image capturing element to detect luminance of at least two images having different spectrum properties; an optical device to focus a superimposed image on the image capturing element; and a distance computing unit to compute distance to the object using parallax between the two images.

With this configuration, as above described, the light paths of the two images having different spectrum properties and parallax can be set to the same light path length and superimposed as one light path by using the optical multiplexer. The optical multiplexer uses, for example, a cross prism, in which light of the two images having different spectrum properties are incident to the cross prism from the opposing incident directions, and then exit from the cross prism as one light path, which is superimposed light of the two images. Because the light paths of the two images may have no difference on the light path length, the two images to be focused via the optical device can be received by adjacent light receiving elements on the image capturing element. Therefore, the positional relationship of the left and right images on the light receiving face on the image capturing element does not change so much. Therefore, matching of the left and right mages can be conducted effectively in the pixel matching process before conducting the distance measurement computing, with which distance measurement computing can be conducted with higher precision.

Embodiment 2

In the Embodiment 1, the cross-talk removing unit is disposed at a stage before the distance computing unit, wherein the cross-talk removing unit removes cross-talk between two image having parallax. With this configuration, as above described, image composed of genuine light component without cross-talk can be obtained.

Embodiment 3

In the Embodiment 2, the chromatic-magnification aberration correction unit is disposed at a later stage of the cross-talk removing unit. If the chromatic difference correction is conducted before the cross-talk removing unit, non-continuous points are required for the coordinate conversion, which is difficult to conduct. Therefore, the chromatic-magnification aberration correction unit is preferably disposed at a later stage of the cross-talk removing unit

Embodiment 4

In the Embodiment 1, the optical device has zoom function. With this configuration, as above described, the same change occurs to images captured by two eyes. With this configuration, the deviation of optical axis, image size and focusing caused by having different spectrum properties for left eye and right eye can be reduced, and natural stereo image can be obtained.

Embodiment 5

In the Embodiment 1, the optical device is disposed inside a vehicle, and the optical multiplexer is disposed outside the vehicle. As above described, distortion, thickness and curvature of a windshield of the vehicle may be different between the left and right portions of the windshield, with which matching of the left and right images may not be conducted. To cancel the effect of such conditions, the image capturing element and the lens unit are disposed inside the vehicle, and the cross prism is disposed outside the windshield of the vehicle. With this configuration, the light of left and right images can pass through the windshield similarly, and receive the effect of the windshield similarly, with which the left and right images can be matched effectively without an effect of the windshield conditions.

Embodiment 6

In the Embodiment 1, the optical multiplexer is filled with medium from a first reflection face from an object to a next reflection face. With this configuration, as above described, a space from a mirror face, which is a face that light coming from an object, positioned a long distance, reflects for the time, to a next mirror face can be filled with a medium of having high refractive index, with which the apparatus can be compact in size.

Embodiment 7

In the Embodiment 1, the optical multiplexer includes a dichroic mirror and a mirror. With this configuration, as above described, by using a simple configuration, the light path length of the left and right images can be set substantially same, and parallax can be obtained similar to usual cameras.

Embodiment 8

In the Embodiment 1, the optical multiplexer includes a half mirror and an optical filter. With this configuration, as above described, by using a simple configuration, the light path length of the left and right images can be set substantially same, and parallax can be obtained similar to usual cameras.

Embodiment 9

In the Embodiment 7, a dichroic mirror or a mirror is disposed such that an angle defined by an optical face of the dichroic mirror or a reflection face of the mirror and the light at the center of angle of view of the optical device is set greater than 45 degrees. With this configuration, as above described, the angle defined by the light at the center of angle of view and the dichroic mirror and the mirror face can be set greater than 45 degrees, with which the prism can be compact in size.

Embodiment 10

In the Embodiment 8, a half mirror or a mirror is disposed such that an angle defined by an optical face of the half mirror or a reflection face of the mirror and the light at the center of angle of view of the optical device is set greater than 45 degrees. With this configuration, as above described, the angle defined by the light at the center of angle of view and the half mirror and the mirror face can be set greater than 45 degrees, with which the prism can be compact in size.

Embodiment 11

In any one of the above Embodiments 1 to 10, the optical aperture is disposed between the optical multiplexer and the optical device to regulate quantity of light entering the optical device. As above described, when the light enters a prism having the dichroic mirror 231 or the mirror faces 232, 233, 234, the light area is already broadened to a certain size depending on the angle of view. Therefore, the size of prism needs to be set depending on the broadened size the light. By disposing the optical aperture 235 at a position near the prism, the size of prism can be compact in size.

Embodiment 12

In the Embodiment 1, the optical multiplexer includes the cross prism. With this configuration, as above described, parallax image having different wavelength properties can be taken using the light-separation type cross prism, with which environmentally-resistant and lower cost apparatus can be devised.

Embodiment 13

In the Embodiment 2, the cross-talk removing unit changes cancelling amount of cross-talk depending on positions on the image. With this configuration, as above described, image composed of genuine light component without cross-talk can be obtained.

Embodiment 14

In the Embodiment 12, a triangular prism, quadrangular prism, or a mirror is disposed at opposing side face of the cross prism. With this configuration, as above described, when the triangular prism or quadrangular prism is used, the apparatus can be compact in size and a broader field of vision can be secured, and when the mirror is used, the apparatus can be configured with reduced cost.

Embodiment 15

In any one of the Embodiments 1 to 14, an infrared cut filter is disposed between an object and the image capturing element. With this configuration, as above described, cross-talk between the left and right images can be reduced.

Embodiment 16

In any one of the Embodiments 1 to 15, a neutral density filter is disposed between an object and the image capturing element. With this configuration, as above described, transmission light quantity of the left and right images due to polarizing beam splitter (PBS) film can be adjusted, with which cross-talk between the left and right images can be reduced.

Embodiment 17

In any one of the Embodiments 1 to 17, the alignment marker is disposed on an area of an optical face of an optical device, where light to be focused on the image capturing face of the image capturing element enters. With this configuration, as above described, when environmental change or overtime change occurs during the production and use, the calibration can be conducted easily.

Embodiment 18

In the Embodiment 17, the alignment marker is a translucent member having a face having curvature, and the face having the curvature is focused on the image capturing face of the image capturing element. With this configuration, as above described, the calibration can be conducted easily without affecting the distance measurement

Embodiment 19

In any one of the Embodiments 1 to 18, another image capturing element is disposed with the image capturing element, in which the image capturing element and another image capturing element are disposed such that a unit that superimposes two images having parallax is sandwiched between the image capturing element and another image capturing element. With this configuration, as above described, various usages can be devised using one unit, and a stereo camera having reduced cost can be provided.

Embodiment 20

In the Embodiment 19, a light emitting unit is disposed on a windshield of a moveable unit such as a vehicle to emit light having a specific wavelength, a light detector is disposed at a position at the opposite of the image capturing element via a unit to superimpose two images having parallax, and a filter to transmit through the specific wavelength to the light detector is disposed, with which raindrops adhered on the windshield of the vehicle can be detected based on light quantity of the reflection light from the windshield. With this configuration, as above described, raindrop detection function can be added using the separated light.

Embodiment 21

In any one of the Embodiments 1 to 20, the coordinate conversion unit is disposed. The coordinate conversion unit conducts coordinate conversion processing to at least one of two images having parallax. With this configuration, as above described, distortion caused by the optical system can be corrected and distance measurement precision can be enhanced.

Embodiment 22

In any one of the Embodiments 2 to 21, the distance computing unit is provided for a block matching computing for two images having parallax, in which the distance computing unit subtracts an average value in the block. With this configuration, as above described, a difference of light of left and right images can be cancelled by offsetting.

Embodiment 23

In the Embodiment 1, the light interpolation unit that interpolates light condition of each pixel based on information from the image capturing element is disposed. With this configuration, as above described, an image having corresponding red pixel and blue pixel can be output for the entire pixels.

In the above described example embodiment, an optical multiplexer can set light paths of two images, having parallax obtained by using difference of spectrum properties, to the same length and superimpose as one light path. The optical multiplexer uses, for example, a cross prism of light selection type, in which light of two images having different spectrum properties enter the cross prism from two opposing incidence surfaces of the cross prism, and then reflected on a reflection face to exit the light by superimposing the light of two images. Therefore, difference of light path length of the two images can be eliminated, and the two images are received by adjacent light receiving elements on the image capturing element via the optical device. With this configuration, the left and right images can be matched in the pixel matching process with high precision conducted before computing the distance measurement. Therefore, distance measurement computing can be conducted with high precision. The above described optical multiplexer can be applied to a stereo camera, with which difference of light path length of the two images can be eliminated and distance measurement computing can be conducted with high precision.

The program can be distributed by storing the program in a storage medium or carrier medium such as CD-ROM. Further, the program can be distributed by transmitting signals from a given transmission device via a transmission medium such as communication line or network (e.g., public phone line, specific line) and receiving the signals. When transmitting signals, a part of data of the program is transmitted in the transmission medium, which means, entire data of the program is not required to be on in the transmission medium. The signal for transmitting the program is a given carrier wave of data signal including the program. Further, the program can be distributed from a given transmission device by transmitting data of program continually or intermittently.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic Tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A stereo camera for measuring distance to an object, the stereo camera comprising:
an optical multiplexer to set a length of respective light paths of each of two images, having different spectrum properties and having parallax, to a same length, and to superimpose each of the light paths of the two images to one light path to generate a superimposed image;
an image capturing element to detect luminance of the two images having different spectrum properties;
an optical device to focus the superimposed image on the image capturing element; and
a distance computing unit to compute distance to the object using the parallax between the two images,
wherein the stereo camera further comprises a cross-talk removing unit to remove cross-talk between the two images having the parallax.

2. The stereo camera of claim 1, wherein the cross-talk removing unit changes a cancelling amount of cross-talk depending on positions on an image.

3. The stereo camera of claim 1, further comprising a chromatic-magnification aberration correction unit disposed at a later stage of the cross-talk removing unit.

4. The stereo camera of claim 1, wherein the optical device has a zoom function.

5. The stereo camera of claim 1, wherein the optical multiplexer is filled with a medium between a first reflection face and a second reflection face, and the first reflection face is a face that light from the object reflects for the first time.

6. The stereo camera of claim 1, further comprising a light interpolation unit that interpolates a light condition of each pixel based on information from the image capturing element.

7. The stereo camera of claim 1, wherein the optical device is disposed inside a vehicle, and the optical multiplexer is disposed outside the vehicle.

8. The stereo camera of claim 1, further comprising an optical aperture disposed between the optical multiplexer and the optical device to regulate a quantity of light entering the optical device.

9. The stereo camera of claim 1, further comprising a neutral density filter disposed between the object and the image capturing element.

10. The stereo camera of claim 1, further comprising a coordinate conversion unit to conduct coordinate conversion processing on at least one of the two images having the parallax.

11. The stereo camera of claim 1, wherein the distance computing unit performs block matching on the two images having the parallax, and subtracts an average value of a block.

12. The stereo camera of claim 1, wherein the optical multiplexer includes a dichroic mirror and a mirror, wherein the dichroic mirror or the mirror is disposed such that an angle defined by an optical face of the dichroic mirror or a reflection face of the mirror and the center of angle of view of the optical device is set greater than 45 degrees.

13. The stereo camera of claim 1, further comprising an optical aperture disposed between the optical multiplexer and the optical device to regulate a quantity of light entering the optical device.

14. The stereo camera of claim 1, wherein the optical multiplexer includes a half mirror and a mirror,
wherein the half mirror or the mirror is disposed such that an angle defined by an optical face of the half mirror or a reflection face of the mirror and the center of angle of view of the optical device is set greater than 45 degrees.

15. The stereo camera of claim 10, further comprising an optical aperture disposed between the optical multiplexer and the optical device to regulate a quantity of light entering the optical device.

* * * * *